United States Patent
Bansal et al.

(10) Patent No.: US 8,943,509 B2
(45) Date of Patent: *Jan. 27, 2015

(54) METHOD, APPARATUS, AND COMPUTER PROGRAM PRODUCT FOR SCHEDULING WORK IN A STREAM-ORIENTED COMPUTER SYSTEM WITH CONFIGURABLE NETWORKS

(75) Inventors: Nikhil Bansal, Yorktown Heights, NY (US); Kirsten W. Hildrum, Hawthorne, NY (US); James Giles, Yorktown Heights, NY (US); Deepak Rajan, Fishkill, NY (US); Philippe L. Seto, Tarrytown, NY (US); Eugen Schenfeld, South Brunswick, NJ (US); Rohit Wagle, Elmsford, NY (US); Joel L. Wolf, Katonah, NY (US); Xiaolan J. Zhang, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

This patent is subject to a terminal disclaimer.

(21) Appl. No.: 12/052,836

(22) Filed: Mar. 21, 2008

(65) Prior Publication Data

US 2009/0241123 A1    Sep. 24, 2009

(51) Int. Cl.
*G06F 9/50* (2006.01)
*G06F 9/48* (2006.01)
*H04L 29/08* (2006.01)

(52) U.S. Cl.
CPC ............ *G06F 9/5066* (2013.01); *G06F 9/4881* (2013.01); *H04L 67/325* (2013.01)
USPC ........................................................ 718/103

(58) Field of Classification Search
None
See application file for complete search history.

(56) References Cited

U.S. PATENT DOCUMENTS 6,671,254 B1    12/2003   Nakahira
6,748,174 B2    6/2004   Milton et al.

(Continued)

FOREIGN PATENT DOCUMENTS

| EP | 0568402 B1 | 1/1999 |
| JP | 2006113566 | 4/2006 |
| WO | WO0186998 A1 | 11/2001 |

OTHER PUBLICATIONS

Lisa Amini, et al., Adaptive Control of Extreme-scale Stream Processing Systems, Proceedings of the 26th IEEE International Conference on Distributed Computing Systems 2006, 7 pages.

(Continued)

*Primary Examiner* — Andrew Caldwell
*Assistant Examiner* — John Lindlof
(74) *Attorney, Agent, or Firm* — Cantor Colburn LLP; Preston Young (57) ABSTRACT

A method, apparatus, and computer program product for scheduling stream-based applications in a distributed computer system with configurable networks are provided. The method includes choosing, at a highest temporal level, jobs that will run, an optimal template alternative for the jobs that will run, network topology, and candidate processing nodes for processing elements of the optimal template alternative for each running job to maximize importance of work performed by the system. The method further includes making, at a medium temporal level, fractional allocations and re-allocations of the candidate processing elements to the processing nodes in the system to react to changing importance of the work. The method also includes revising, at a lowest temporal level, the fractional allocations and re-allocations on a continual basis to react to burstiness of the work, and to differences between projected and real progress of the work.

26 Claims, 7 Drawing Sheets

(56) References Cited

U.S. PATENT DOCUMENTS

| | | |
|---|---|---|
| 6,792,174 B1 | 9/2004 | Ramaswami |
| 6,809,734 B2 | 10/2004 | Suzuoki et al. |
| 6,850,989 B1 | 2/2005 | Lavian et al. |
| 7,000,022 B2 | 2/2006 | Lisitsa et al. |
| 7,263,096 B2 | 8/2007 | Yang et al. |
| 7,441,224 B2 | 10/2008 | Bellas et al. |
| 7,620,323 B2 | 11/2009 | Strasser et al. |
| 2002/0131103 A1 | 9/2002 | Bambos |
| 2003/0118006 A1 | 6/2003 | Yang et al. |
| 2004/0052527 A1 | 3/2004 | Kirby |
| 2004/0131308 A1 | 7/2004 | Mao et al. |
| 2005/0105905 A1 | 5/2005 | Ovadia et al. |
| 2005/0165854 A1* | 7/2005 | Burnett et al. ............... 707/200 |
| 2007/0043742 A1 | 2/2007 | Arguello et al. |
| 2007/0180451 A1* | 8/2007 | Ryan et al. .................. 718/104 |
| 2007/0198971 A1 | 8/2007 | Dasu et al. |
| 2007/0204020 A1 | 8/2007 | Anderson et al. |
| 2007/0211280 A1 | 9/2007 | Bansal et al. |
| 2007/0214458 A1 | 9/2007 | Bansal et al. |
| 2008/0025238 A1 | 1/2008 | McCown et al. |
| 2008/0025288 A1 | 1/2008 | Benner et al. |
| 2008/0250390 A1 | 10/2008 | Feblowitz et al. |
| 2009/0119238 A1 | 5/2009 | Amini et al. |
| 2009/0238178 A1 | 9/2009 | Giles et al. |
| 2009/0241123 A1 | 9/2009 | Bansal et al. |
| 2009/0300623 A1 | 12/2009 | Bansal et al. |
| 2010/0042809 A1 | 2/2010 | Schenfeld et al. |
| 2010/0242042 A1 | 9/2010 | Bansal et al. |

OTHER PUBLICATIONS

Kevin J. Barker, et al., On the Feasibility of Optical Circuit Switching for High Performance Computing Systems, Conference on High Performance Networking and Computing, Proceedings of the 2005 ACM/IEEE Conference on Supercomputing, 22 pages.

U.S. Appl. No. 11/374,192, filed Mar. 13, 2006.

U.S. Appl. No. 11/840,556, filed Aug. 17, 2007.

U.S. Appl. No. 12/052,814, filed Mar. 21, 2008.

William J. Daly, et al., Merrimac: Supercomputing with Streams, SC'03, Nov. 15-21, 2003, Phoenix, Arizona, Copyright 2003 ACM, 8 pages.

U.S. Appl. No. 12/193,125, filed Aug. 18, 2008.

Charu C. Aggarwal et al., Challenges and Experience in Prototyping a Multi-Modal Stream Analytic and Monitoring Application on System S, VLDB, Sep. 23-28, 2007, Vienna, Austria.

International Search Report; International Application No. PCT/EP2009/060483; International Filing Date: Aug. 13, 2009; Date of Mailing: Oct. 19, 2009; 11 pages.

S.P. Chang et al., A Reconfigurable Interconnect Fabric With Optical Circuit Switch and Software Optimizer for Stream Computing Systems, Optical Society of America, 2009.

Henrique Andrade et al., SPADE: The System S Declarative Stream Processing Engine, SIGMOD, Jun. 9-12, 2008, pp. 1123-1134, Vancouver, BC, Canada.

Roden, C., et al. "Modeling a circuit switched fiber optic interconnection for MIMD multiprocessor system"; ICEC '95, International Conference on Electronics, Circuits & Systems, Amman, Jordan, Dec. 17-21, 1995, p. 537-542.

European Office Action dated Mar. 22, 2011 for Application No. 09 781 791.0-2211, p. 1-6.

Hong, Jiang, et al.; "Efficient algroithms for non-blocking wormhole routing and circuit switching on linear array mulitprocessors"; Parallel and Distributed Computing Systems: Proceedings of the ISCA International Conference, Oct. 6-8, 1994, International Society for Computers and their Applications, Jan. 1994, p. 614-619.

Yasrebi, M., et al.; "A comparison of circuit switching and packet switching for data transfer in two simple image processing algorithms"; Proceedings of the 1983 International Conference on Parallel Processing, Aug. 23-26, 1983, IEEE, US, Jan. 1983, p. 25-28.

U.S. Appl. No. 12/942,492; Non-Final Office Action; Date Filed: Nov. 9, 2010; Date Mailed: Jan. 14, 2011, p. 1-15.

Shao, Shuyi, et al.; "Symbolic expression analysis for compiled communication"; 2008 IEEE International Parallel & Distributed Processing Symposium, Apr. 18, 2008, p. 2255-2262.

Written Opinion of the International Searching Authority; International Application No. PCT/EP2009/060483; International Filing Date: Aug. 13, 2009; Date of Mailing: Oct. 19, 2009; p. 1-7.

* cited by examiner

METHOD, APPARATUS, AND COMPUTER PROGRAM PRODUCT FOR SCHEDULING WORK IN A STREAM-ORIENTED COMPUTER SYSTEM WITH CONFIGURABLE NETWORKS

STATEMENT REGARDING FEDERALLY SPONSORED RESEARCH AND DEVELOPMENT

This invention was made with Government support under Contract No. H98230-07-C-0383 awarded by the U.S. Department of Defense. The Government has certain rights in this invention.

BACKGROUND OF THE INVENTION

The present disclosure relates generally to scheduling work in a stream-based distributed computer system with configurable networks, and more particularly, to systems and methods for deciding which tasks to perform in a system including fractionally assigning processing elements in those tasks to processing nodes, and measuring the utility of streams produced by the tasks.

Distributed computer systems, especially those with configurable networks and which are designed specifically to handle very large-scale stream processing jobs, are in their infancy. Several early examples augment relational databases with streaming operations. Distributed stream processing systems are likely to become very common in the relatively near future, and are expected to be employed in highly scalable distributed computer systems to handle complex jobs involving enormous quantities of streaming data.

In particular, systems including tens of thousands of processing nodes able to concurrently support hundreds of thousands of incoming and derived streams may be employed. These systems may have storage subsystems with a capacity of multiple petabytes. Some of these systems, which include the focus of this invention, are expected to have networks that are configurable, in order to deal with the dynamic nature of the streams in the system.

Focusing on the scheduling of work in such a streaming system, it is clear that an effective optimization method is needed to use the system properly. Consider the complexity of the scheduling problem as follows.

Figure 1:
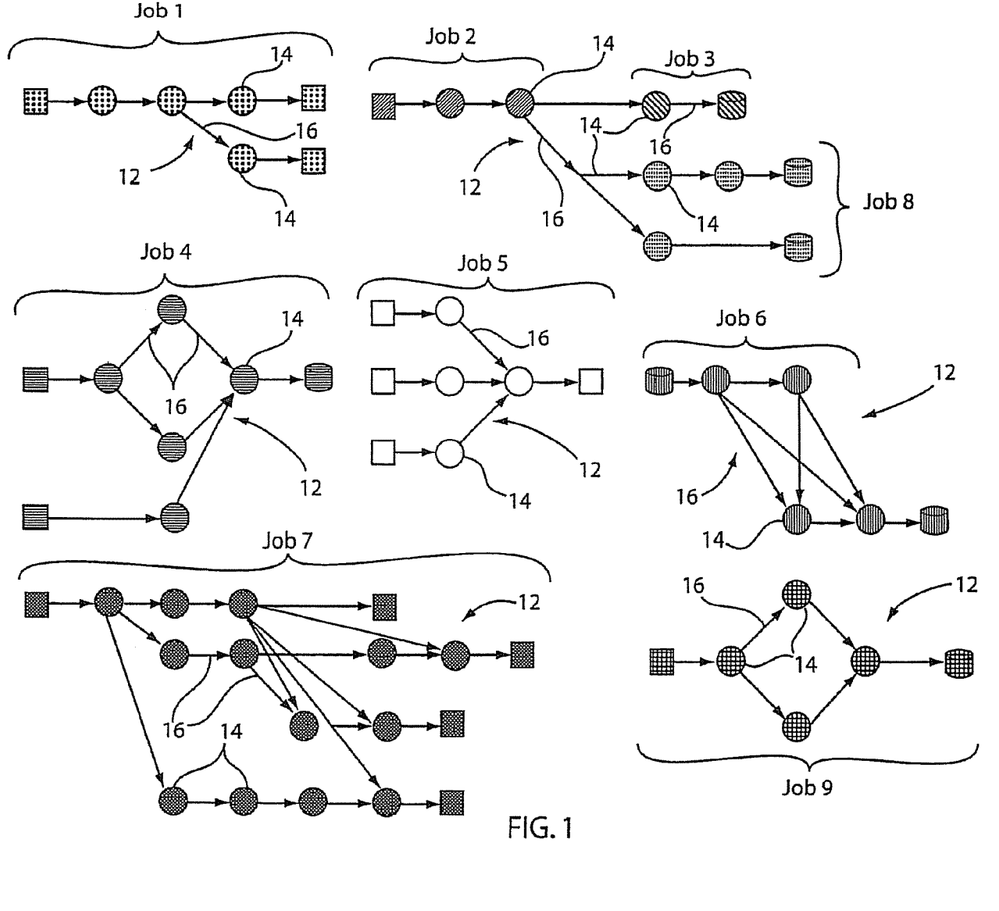
FIG. 1 depicts an example of a collection of jobs, including alternative templates, processing elements and streams used in a conventional system that schedules the jobs.

Referring to FIG. 1, a conceptual system is depicted for scheduling typical jobs. Each job 1-9 includes one or more alternative directed graphs 12 with processing nodes 14 and directed arcs 16. For example, job 8 has two alternative implementations, called templates. The nodes 14 correspond to tasks (which may be called processing elements, or PEs), interconnected by directed arcs (streams). The streams may be either primal (incoming) or derived (produced by the PEs). The jobs themselves may be interconnected in complex ways by means of derived streams. For example, jobs 2, 3, and 8 are connected.

Figure 2A:
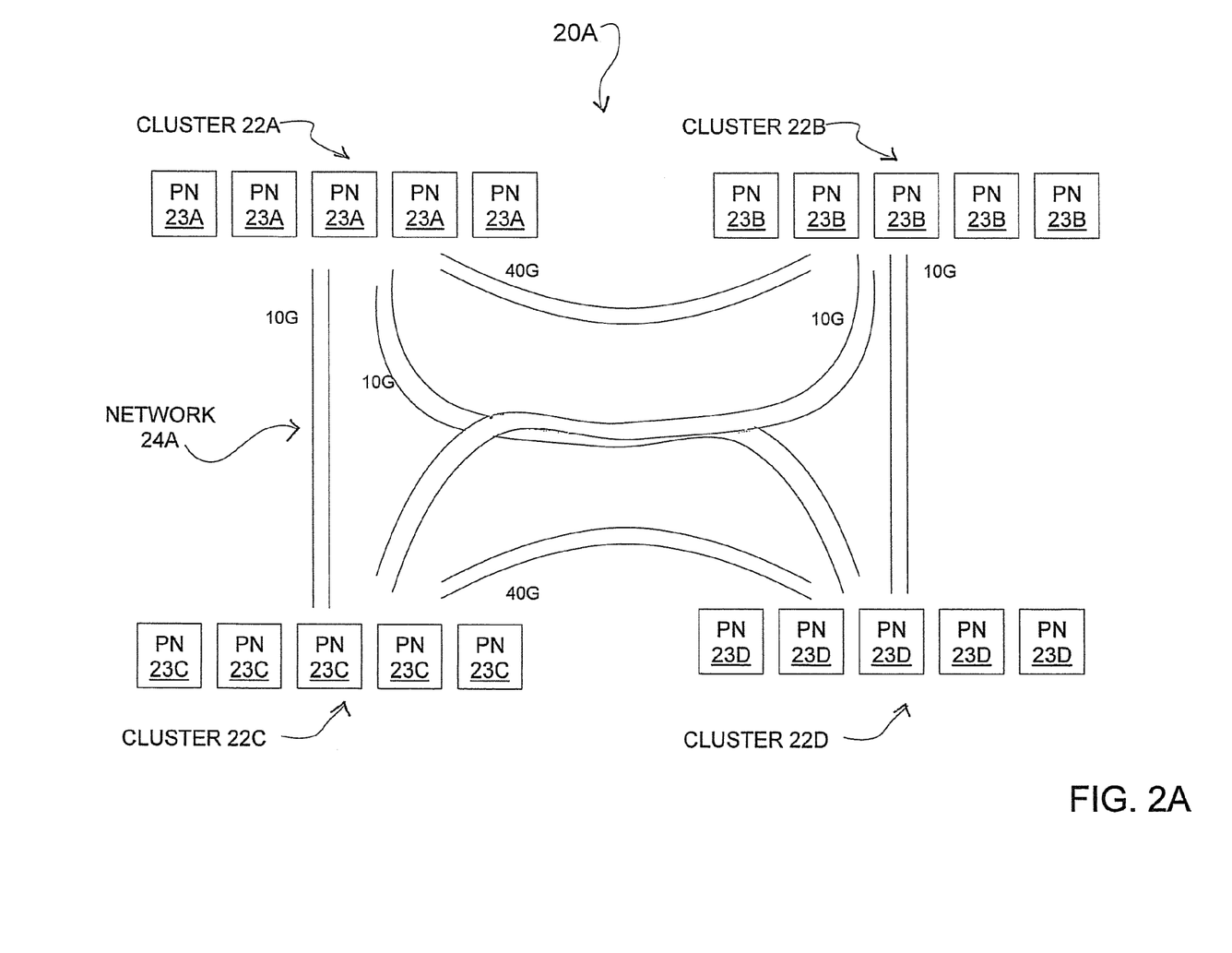
FIG. 2A depicts an example of processing nodes and a network of a distributed stream-based system including switches.
Figure 2B:
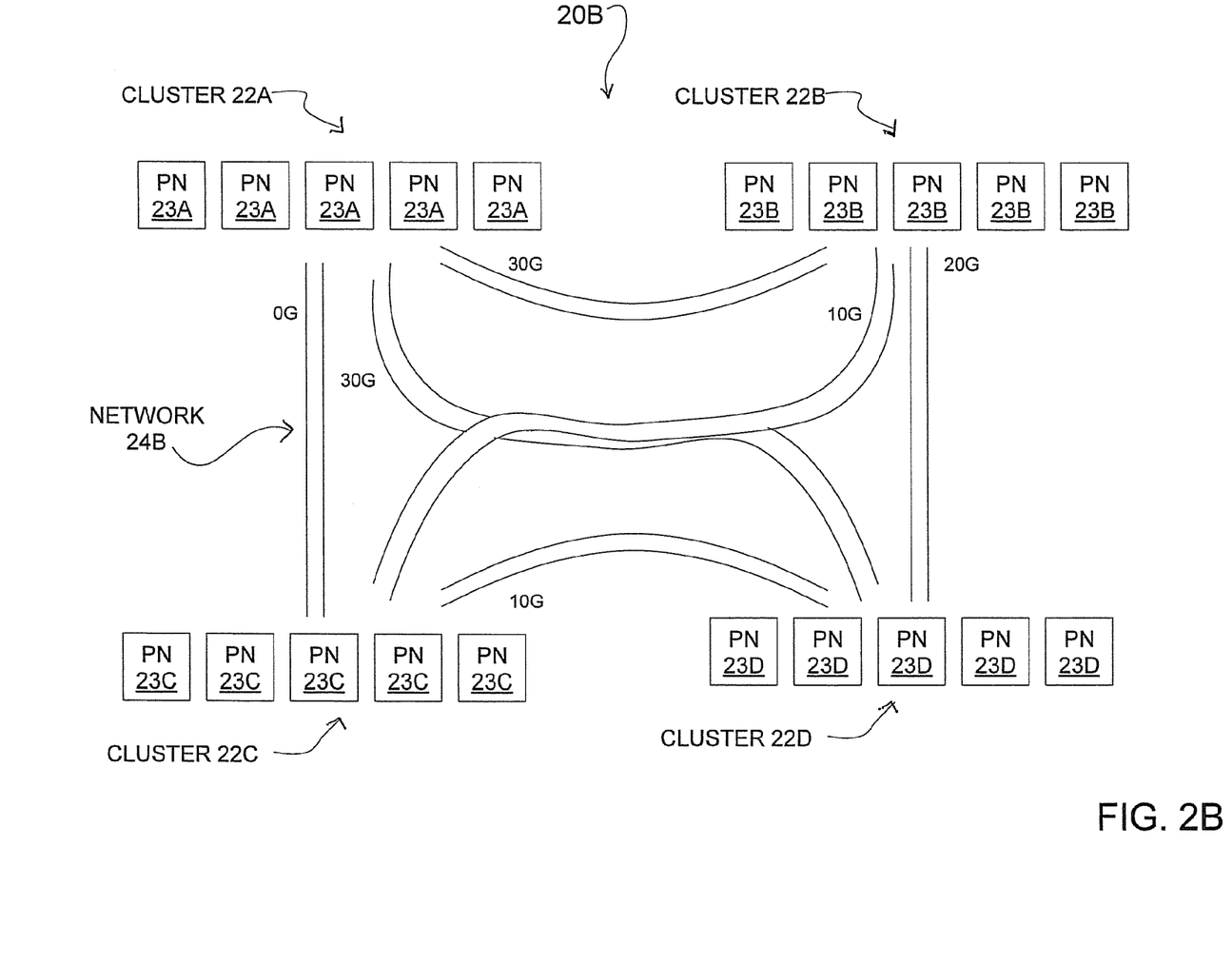
FIG. 2B depicts another configuration of the network of FIG. 2A.

Referring to FIG. 2A, a typical configurable distributed computer system 20A is shown. Clusters of processing nodes, represented as clusters 22A-22D, each include processing nodes (PNs) 23A-23D, respectively, that are interconnected by a network 24A. The interconnections are formed by links. The network 24A may be modified in terms of the connectivity between the clusters 22A-22D of nodes 23A-23D, into a network 24B, as illustrated in a distributed computer system 20B of FIG. 2B. For instance, the capacity of the links between cluster 22A to cluster 22B is changed from 40 Gbps (in network 24A) to 30 Gbps (in network 24B). Connections between clusters 22A-22D may also disappear (e.g., the capacity between cluster 22A and cluster 22C is 0 Gbps in network 24B).

Even at these sizes, streaming systems are expected to be essentially swamped at almost all times. Processors will be nearly fully utilized, the offered load (in terms of jobs) will far exceed the prodigious processing power capabilities of the systems, and the storage subsystems will be virtually full. Such goals make the design of future systems enormously challenging.

Focusing on the scheduling of work in such a streaming system, it is clear that an effective optimization method is needed to use the system properly.

A patent application entitled "METHOD AND APPARATUS FOR SCHEDULING WORK IN A STREAM-ORIENTED COMPUTER SYSTEM," U.S. patent application Ser. No. 11/374,192, filed on Mar. 13, 2006, describes a scheduler for stream processing systems. This application is commonly assigned to the assignees of the instant application and is incorporated by reference herein in its entirety. The scheduler disclosed in U.S. patent application Ser. No. 11/374,192 is for use in static networks.

What is needed is way to resolve the aforementioned scheduling problems for stream processing systems with configurable networks.

BRIEF SUMMARY OF THE INVENTION

Exemplary embodiments of the invention include a method for scheduling stream-based applications in a distributed computer system with configurable networks. The method includes choosing, at a highest temporal level, jobs that will run, an optimal template alternative for the jobs that will run, network topology, and candidate processing nodes for processing elements of the optimal template alternative for each running job to maximize importance of work performed by the system. The method further includes making, at a medium temporal level, fractional allocations and re-allocations of the candidate processing elements to the processing nodes in the system to react to changing importance of the work. The method also includes revising, at a lowest temporal level, the fractional allocations and re-allocations on a continual basis to react to burstiness of the work, and to differences between projected and real progress of the work.

Exemplary embodiments of the invention further include a computer program product for scheduling stream-based applications in a distributed computer system with configurable networks. The computer program product includes a storage medium readable by a computer processor and storing instructions for execution by the computer processor for implementing a method. The method includes choosing, at a highest temporal level, jobs that will run, an optimal template alternative for the jobs that will run, network topology, and candidate processing nodes for processing elements of the optimal template alternative for each running job to maximize importance of work performed by the system. The method further includes making, at a medium temporal level, fractional allocations and re-allocations of the candidate processing elements to the processing nodes in the system to react to changing importance of the work. The method also includes revising, at a lowest temporal level, the fractional allocations and re-allocations on a continual basis to react to burstiness of the work, and to differences between projected and real progress of the work.

Exemplary embodiments further include an apparatus for scheduling stream-based applications in a distributed computer system with configurable networks. The apparatus includes a scheduler configured to schedule work using three temporal levels including: a macro method configured to determine network topology and schedule jobs that will run, in a highest temporal level, in accordance with a plurality of operation constraints to optimize importance of work; a micro method configured to fractionally allocate, at a medium temporal level, processing elements to processing nodes in the system to react to changing importance of the work; and a nano method configured to revise, at a lowest temporal level, fractional allocations on a continual basis to react to burstiness of the work, and to differences between projected and real progress.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with an exemplary embodiment, a scheduler and method for scheduling work in a stream-oriented computer system using configurable networks is provided. The work (job) is scheduled in a manner that maximizes the overall importance of the work performed. In particular, the exemplary scheduler optimizes the amount of computing resources given to multiple computer jobs composed of individual processing elements (PEs). It also decides on a list of optimized candidate processing nodes (PNs) on which each such tasks will run, simultaneously reconfiguring the network to maximize a variety of metrics.

A scheduler needs to perform each of the following functions: (1) decide which jobs to perform in a system; (2) decide, for each such performed job, which template to select; (3) fractionally assign the PEs in those jobs to the PNs; and (4) configure the network topology such that the streams can be transported efficiently. In other words, it should overlay the PEs of the performed jobs onto the PNs of the computer system, overlay the streams of those jobs onto the configured network of the computer system, and attempt to maximize a measure of the utility of the streams produced by those jobs.

U.S. patent application Ser. No. 11/374,192 referenced above illustrates the practical issues that make it difficult for a scheduler to provide this functionality effectively. The disclosure also describes a three-level hierarchical apparatus and method that creates high quality schedules in a distributed stream-based environment. The hierarchy is temporal in nature. As the levels increase, the difficulty in solving the problem also increases. However, more time to solve the problem is provided as well. Furthermore, the solution to a higher-level problem makes the next lower level problem more manageable. The three levels, from top to bottom, may be referred to for simplicity as the macro, micro and nano models, respectively.

Figure 3:
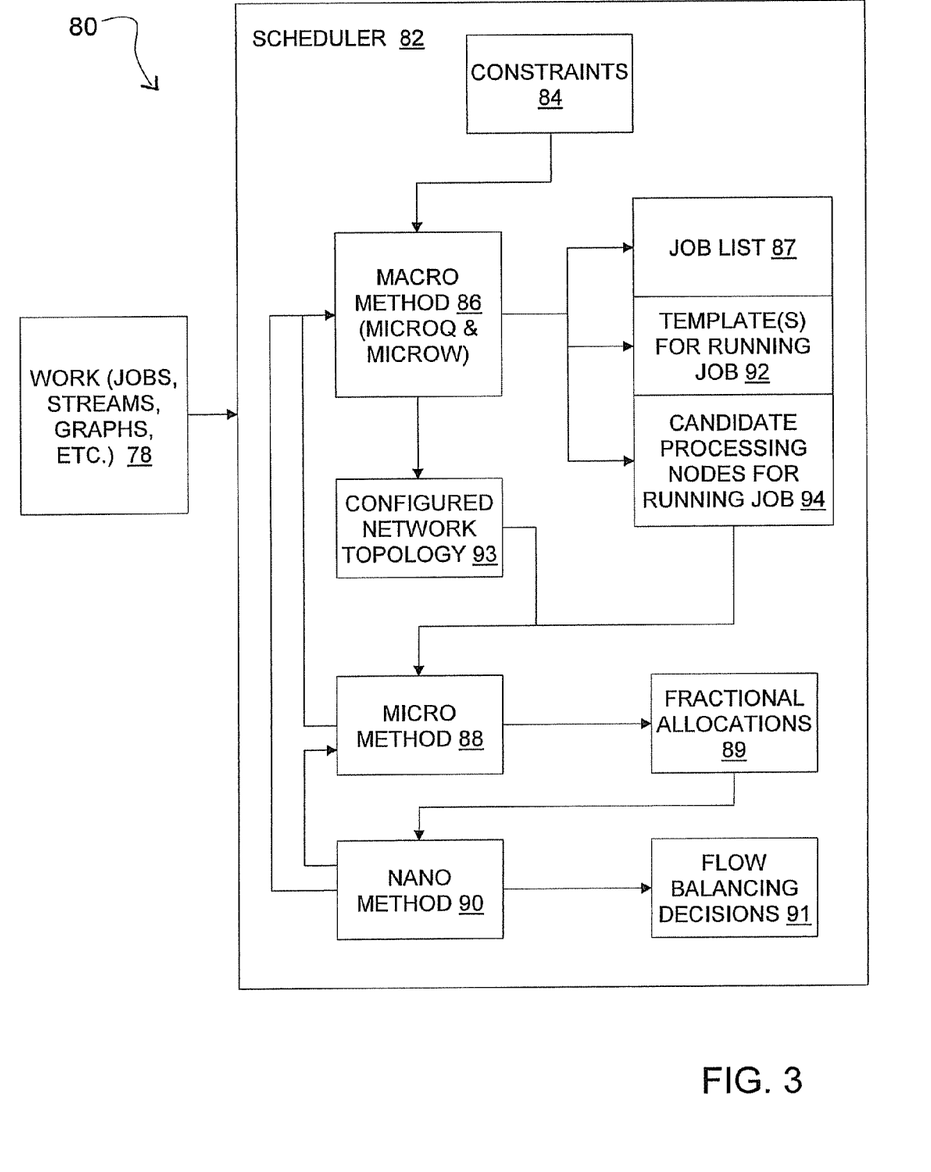
FIG. 3 is a block/flow diagram illustratively showing a scheduler in accordance with an exemplary embodiment.

Referring now to FIG. 3, an exemplary scheduler 82 will now be described. A system 80 includes a hierarchically designed scheduler 82 for distributed computer systems designed for stream-based applications. The scheduler 82 attempts to maximize the importance of all work in the system, subject to a large number of constraints 84. The scheduler 82 includes three major methods at three distinct temporal levels. These are known as the macro 86, micro 88 and nano 90 models, respectively.

The scheduler 82 receives templates, data, graphs, streams or any other schema representing jobs/applications 78 to be performed by system 80. The scheduler 82 employs the constraints 84 and the hierarchical methods to provide a solution the scheduling problems presented using the three temporal regimes as explained hereinafter.

Beginning with the macro method/model 86, constraints 84 or other criteria are employed to permit the best scheduling of tasks. The macro method 86 performs the most difficult scheduling tasks. The output of the macro model 86 is a list 87 of which jobs will run, a choice of one of potentially multiple alternative templates 92 for running the job, the lists of candidate processing nodes 94 for each processing element that will run, and the configuration of the network of the system 93. The output of the micro model 88 includes fractional allocations 89 of processing elements to processing nodes based on the decisions of the macro model 86.

The nano model 90 implements flow balancing decisions 91 of the micro model 88 at a much finer temporal level, dealing with burstiness and the differences between expected and achieved progress.

The exemplary scheduler 82 builds upon the macro method disclosed in commonly assigned patent application Ser. No. 11/374,399, entitled "METHOD AND APPARATUS FOR ASSIGNING CANDIDATE PROCESSING NODES TO WORK IN A STREAM-ORIENTED COMPUTER SYSTEM," filed on Mar. 13, 2006, the contents of which are incorporated by reference herein in its entirety. The disclosure describes a macro method for static networks. The exemplary scheduler 82 of the instant invention implements a macro method for configurable networks, as described herein.

In an exemplary embodiment, the scheduler 82 employs two decoupled sequential methods which comprise the macro method 86: MacroQ and MacroW. MacroQ is the 'quantity' component of the macro model 86. It maximizes projected importance by deciding which jobs to do, by choosing a template for each job that is done, and by computing flow balanced PE processing allocation goals, subject to job priority constraints 84. Exemplary embodiments may utilize a combination of dynamic programming, non-serial dynamic programming, and other resource allocation problem techniques.

MacroW is the 'where' component of the macro model. It minimizes projected network traffic by configuring the network, and uniformly over-provisioning nodes to PEs based on the goals given to it by the macroQ component, all subject to incremental, resource matching, licensing, security, privacy, uniformity, temporal and other constraints. Exemplary embodiments may be based on a combination of binary integer programming, mixed integer programming, and heuristic techniques.

In an exemplary embodiment, macroW minimizes projected network traffic. However, in other embodiments, the objective may include other components which measure resource utilization on the network (node CPU load, etc.)

The 'best' solution returned by macroW corresponds to an optimal network topology and PE allocation 93 that minimizes the objective under consideration, for the current set of jobs admitted to the system, subject to the constraints 84. The best solution includes determining a best template alternative (also referred to herein as optimal template alternative) in response to the processing performed by the models of the scheduler 82.

The exemplary scheduler 82 builds upon a micro method disclosed in commonly assigned patent application Ser. No. 11/374,643, entitled "METHOD AND APPARATUS FOR ASSIGNING FRACTIONAL PROCESSING NODES TO WORK IN A STREAM-ORIENTED COMPUTER SYSTEM," filed on Mar. 13, 2006, the contents of which are incorporated by reference herein in its entirety. The disclosure describes a micro method for static networks. The exemplary scheduler 82 of the instant invention implements a micro method 88 for configurable networks, as described herein.

The micro model 88 handles dynamic variability in the relative importance of work (e.g., via revised "weights"), changes in the state of the system, changes in the job lists, changes in the job stages, without having to consider the difficult constraints handled in the macro model 86, including but not limited to licensing, security, template choices, etc.

Thus, the micro model 88 exhibits an effective balance between problem design and difficulty, as a result of the output from macro model 86. The micro model 88 is flexible enough to deal with dynamic variability in importance and other changes, also due to the "heavy lifting" in the macro model 86. Here "heavy lifting" means that the micro model 88 will not have to deal with the issues of deciding which jobs to run and which templates to choose because the macro model 86 has already done this. Thus, in particular, the difficulties associated with maximizing importance and minimizing networks subject to a variety of difficult constraints has already been dealt with, and the micro model 88 need not deal further with these issues. "Heavy lifting" also means that the micro model 88 will be robust with respect to dynamic changes in relative importance and other dynamic issues, because the macro model 86 has provided a candidate processing node solution 94, which is specifically designed to robustly handle such dynamic changes to the largest extent possible.

The nano model 90 balances flow 91 to handle variations in expected versus achieved progress. It exhibits a balance between problem design and hardness, as a result of output from the micro model 88.

At the nano level, revising the fractional allocations and re-allocations 89 of the micro model 88 on a continual basis is performed to react to burstiness of the work, and to differences between projected and real progress.

The macroW model of macro method 86 will now be described in accordance with an exemplary embodiment. The macroW model receives a set of PEs (e.g., jobs, streams, graphs, etc. 78) from the macroQ model. These PEs ultimately need to be assigned to the processing nodes (PNs) (e.g., PNs 23A-23D) in the computer system, and simultaneously, the network topology of the computer system must be configured. But the computer system environment is very dynamic and the resource requirements of PEs may increase of decrease dramatically over time. If the requirement for a PE increases, the system of the present invention needs to be able to quickly execute the requirement on additional PNs. For this purpose, the macroW model creates a list of candidate nodes 94 where this PE is "ready to run". The "ready to run" list for a PE should be balanced. One cannot grossly over-provision each PE due to limited resources.

On the other hand, the macroW model needs to allocate enough resources so that the scheduler 82 can deal with variations in the demands. One goal of macroW is to find such a balanced allocation. In particular, one of the outputs of macroW is an assignment of PEs to PNs. If a PE is assigned to a PN, this means that this PE is allowed to run on that PN.

Another output of the macroW module is the configuration of the network 93.

A third output of the macroW module is the transport mechanism to be used (if there are multiple choices) for each PE pair (stream), and the route (links on the configured network) that each of those streams should use 92.

This solution (PE assignment, network topology) needs to respect various constraints 84, so that the scheduler 82 does not incur problems when it is time to actually run a PE on a PN. At a high level, these constraints may include all the constraints handled by macroW for static networks, in addition to those described below.

Flow-balance constraints: For each stream, the macroW must ensure that the flow is sent from the source node (i.e., a processing node where the source PE is assigned) to the sink node (i.e., a processing node where the sink PE is assigned). These constraints thus ensure that all traffic pair demands are met.

Link capacity constraints: For each link on the network, macroW must ensure that the net traffic flowing on that link is less than its capacity.

Cluster capacity constraints: For each cluster (e.g., clusters 22A-22D) on the network, only a limited number of links may be available. MacroW must respect such limits at each cluster.

At a high level, the design of macroW will now be described in an exemplary embodiment. The macroW problem is solved in two phases:

First, this problem may be solved using an integer-linear program (ILP) where there are many continuous variables but only few integer variables. It will be appreciated that ILPs are well known by those skilled in the art, as well as in the literature (see, for example, D. Bertsimas and J. Tsitsiklis, "Introduction to Linear Optimization," Athena Scientific, 1997). This ILP is quite accurate and will take into account almost all of the constraints involved. Even though taking all these constraints into account for a problem on a large number of PNs may lead to a huge system of equations, embodiments of the present invention are able to solve this efficiently because the scheduler 82 permits the PE to PN assignments to be fractional instead of binary. A partial description of this ILP is given in patent application Ser. No. 11/374,399. The exemplary scheduler 82 accounts for additional constraints and variables needed for modeling macroW for configurable networks.

Second, the problem may be solved using a local improvement heuristic module, which is referred to herein as miniW. Those skilled in the art will know that local improvement schemes are well understood in the literature (see, for example, Emile Aarts, Jan K. Lenstra, "Local Search in Combinatorial Optimization," John Wiley & Sons, Inc., 2003). This heuristic is quite accurate and will take into account all of the constraints involved. Even though talking all these constraints into account for a problem on a large number of PNs could lead to large running times, exemplary embodiments of the present invention are able to solve this efficiently using of a variety of schemes described further herein. In an exemplary embodiment, the local improvement heuristic seeds itself (e.g., chooses as the starting solution) with the solution of the ILP.

In an exemplary embodiment, both the ILP solution and the local improvement heuristic are deadline-aware; i.e., they will terminate given a time bound and report the best solution found at termination.

Figure 4:
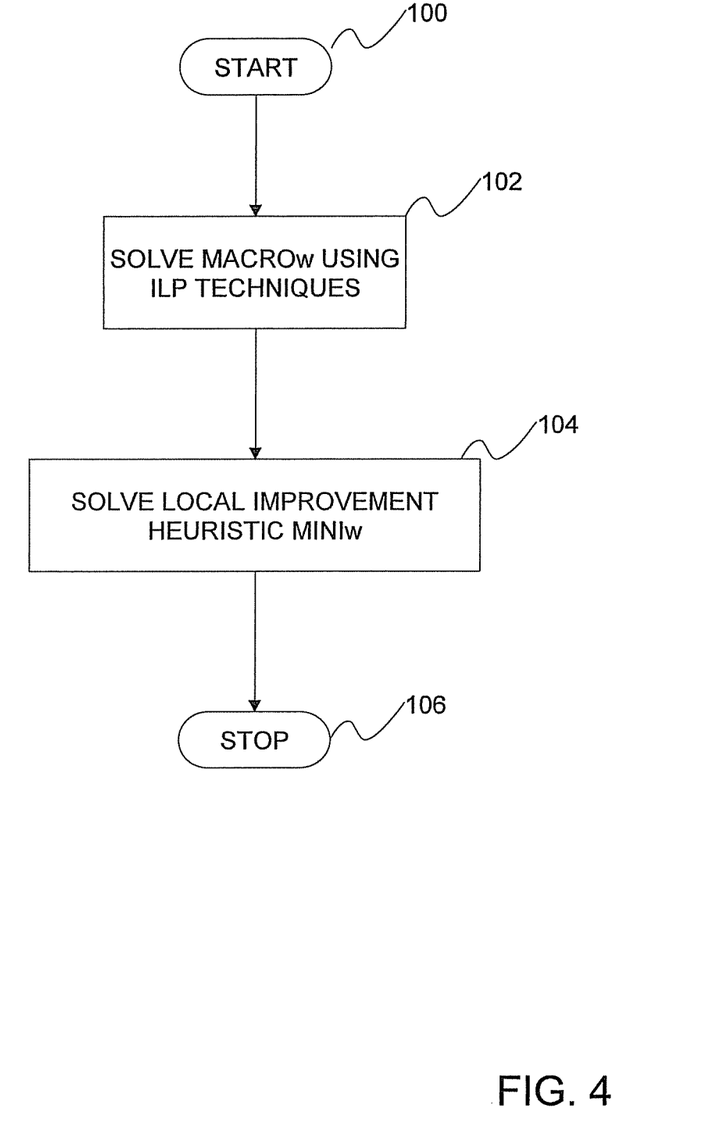
FIG. 4 is a flowchart describing an illustrative macroW model method of the scheduler of FIG. 3 in accordance with an exemplary embodiment.

Referring now to FIG. 4, a flowchart describing the macroW for configurable networks is illustratively shown. The process begins at block 100 whereby the problem is solved using the ILP approach in block 102, which returns the network configuration allocation of PEs to nodes as an initial solution for the local improvement phase miniW in block 104, and the process ends in block 106.

In an exemplary embodiment, the macroW problem, of allocating PEs to nodes and configuring the network topology, is solved simultaneously.

The ILP formulation in block 102 will now be described with respect to one exemplary embodiment. In the ILP formulation, the traffic for a certain stream to be broken up into multiple paths (splittable flow) can be easily modified by anyone skilled in the art of ILP to model the unsplittable case.

The following notation is used in the formulation.

Basic Input Data:

C: set of clusters, indexed by k

T: set of traffic pairs (streams), indexed by tp p1(tp): source PE of traffic pair tp∈T p2(tp): sink PE of traffic pair tp∈T ttp: average traffic requirement of traffic pair tp∈T L: set of cluster pairs (links). Cluster pairs are indexed using '1'. These links may be perceived as an ordered pair of clusters; thus, they are analogous to directed arcs. A head cluster and a tail cluster for each arc may then be defined. Similarly, outgoing and incoming arcs at each cluster may also be defined.

O(k)—Outgoing arcs at cluster k.

I(k)—Incoming arcs at cluster k $c_l$—Capacity of link l $b_k$—Number of links that cluster k can use For configuring the network topology, an exemplary embodiment utilizes new variables to model the flow of traffic pairs on the network, and the number of optical links to connect cluster pairs. The relevant decision variables for macroW for configurable networks are:

$w_{p,k}$: This variable is 1 if PE p is allocated to cluster k; 0 otherwise $yt_{p,k}$: This variable is the supply (scaled) of traffic pair tp at cluster k. ytp,k should therefore be +1 at the source of a traffic pair, −1 at the sink, and 0 everywhere else zl=number of optical links used to connect cluster pair l ul,tp=fraction of traffic pair tp that is connected using link l Compared to the macroW formulation for static networks, the exemplary embodiment uses $O(|T||C|^2)$ additional continuous variables and $O(|C|^2)$ additional integer variables.

To model un-splittable flow, ul,tp is redefined as binary variables. Then, $O(|T||C|^2)$ binary variables are needed.

As a result, the new constraints to model macroW for configurable networks are provided below.

Supply constraints: wp1(tp), k−wp2(tp), k=ytp, k∀tp, k

These constraints ensure that for traffic pair tp, ytp,k should be +1 at the source, −1 at the sink, and 0 everywhere else.

Flow-balance constraints:

ttp(Σl∈O(k)ul, tp−Σl∈I(k)ul,tp)=ytp, k∀tp, k

These constraints ensure that all traffic pair demands are met.

Link capacity constraints: Σtp ul, tp≤cl zl ∀l. These constraints ensure that the net capacity between any pair of clusters is not violated.

Cluster capacity constraints: Σl∈(O(k)∪I(k))zl≤bk ∀k. These constraints ensure that the number of connections at each cluster is limited.

Compared to the macroW formulation for static networks, we have O(|T||C|) additional constraints.

The formulation size is essentially unchanged, compared to macroW for static networks, since the number of new variables/constraints added is comparable.

The local improvement heuristic miniW provided in block 104 will now be described in an exemplary embodiment. The macroW is solved also using a local improvement heuristic. Those skilled in the art will know that such heuristics are natural solution techniques for certain classes of optimization problems, often developed for the following reasons:

Intuitive: The nature of the problem lends itself to a local improvement heuristic, since it is very easy to evaluate a solution (even though the objective is inherently nonlinear) and check feasibility, but much harder to solve to optimality. As a result, a good local improvement heuristic is a key component of macroW in the scheduler.

Redundancy: In case of an unexplained error/failure in the alternative solution approach (using ILP), miniW provides a robust back up.

Completeness: For very large problem instances (or with limited time), inspire of the clever tricks utilized in the preferred embodiment of the ILP solution technique, it is possible that macroW may not converge (those skilled in the art of ILP know that this is possible); providing a solution that may be optimal, but without a guarantee of optimality. Thus, a local improvement heuristic that seeds itself with the solution could potentially improve the solution.

Accuracy: Traffic components of the formulation are inherently quadratic in nature. Thus, in the ILP scheme for large problem instances, this results in a loss of accuracy for smaller traffic streams, which is corrected by miniW.

Key components of any local improvement heuristic include: initial solution heuristics; local improvement framework; scaling to large problem instances (pre-processing); and avoiding local optima (perturbation scheme).

Figure 5:
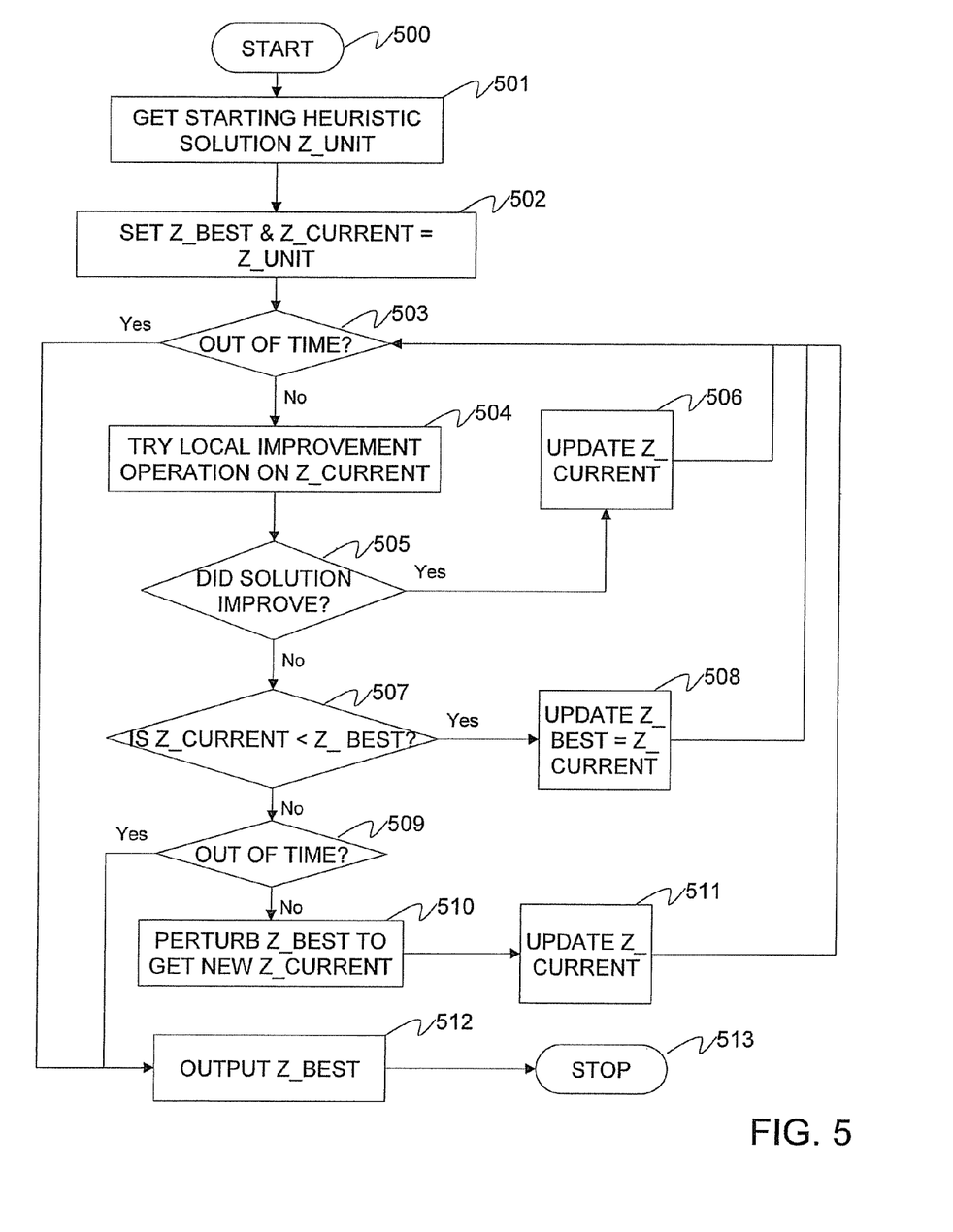
FIG. 5 is a flowchart describing an illustrative miniW model method of the scheduler of FIG. 3 in accordance with an exemplary embodiment.

Referring now to FIG. 5, a flowchart of the main components of the local improvement heuristic miniW (provided in block 104) is illustratively shown. In this description, the term z_best is used to represent the best solution obtained by the heuristic at any time, z_current to represent the current solution, and z_init to represent the best solution obtained by the initial heuristics.

The method/program begins in block 500. In block 501, all the initial solution heuristics are run and their results are stored by setting z_init to be the best solution among those obtained by these heuristics. The method initializes the local improvement phase in block 502 by setting z_current and z_best to z_init.

In block 503, the method checks to see if time deadline has passed. This is done after every local improvement step. If the time deadline has passed, then the method passes control to block 512, which reports the best solution obtained so far (z_best), and terminates at block 513.

However, if the time deadline has not passed (in block 503), the method attempts a local improvement on the current solution (z_current) in block 504. Then, in block 505, the method checks to see if these local operations resulted in an improvement. If improvements occur, then the method updates the current solution z_current in block 506 and returns to block 503 to check if the time deadline has been hit. If the method could find no local operations that resulted in a improvement, then control of the method passes to block 507.

In block 507, the method checks to see if the current solution is better than the best solution found by the method, miniW. If the current solution is better, the method updates the best solution in block 508 by setting z_best to z_current. Then, (or if the current solution is not better), the method passes control to block 503 to check if the time deadline has passed. If the time deadline has passed, then control passes to block 512.

If no improvements are found (block 505) and the time deadline has not been passed (block 509), then the control of the method passes to block 510. This is the part of miniW which attempts to avoid local optima. In an exemplary embodiment, this is achieved by a perturbation scheme, which modifies, in block 511 the best solution z_best to obtain a new z_current. Then, control is passed back to block 503 for the local improvement phase.

Those skilled in the art of local improvement heuristics know that it is critical for the heuristic to start with a good solution. In an exemplary embodiment of miniW, the following algorithms are used to obtain a solution, and choose the best solution among them as the starting solution. Other embodiments may use other initial solutions.

Random-Feas: In this algorithm, PEs are randomly allocated to nodes, while ensuring feasibility. This is incorporated as a failsafe solution, and to evaluate other starting heuristics.

Greedy-Streams: In this algorithm, streams are sorted based on traffic, and clusters sorted in terms of available load. Then, the PEs in these streams are mapped to the clusters, which ensure feasibility.

ILP solution: The solution described by the ILP technique is used as a starting solution.

Prev-Epoch: Since the scheduler will usually be running in a multi-epoch state, this algorithm attempts to merge the solution of the previous epoch as much as possible. For instance, PEs that will be counted against an incremental movement constraint are set to their previous epoch solution, and only the others allocated.

Local improvement framework: This is the main part of a local improvement heuristic. Given the current solution, miniW successively changes PE/node allocations and cluster/link assignments to obtain sequentially better solutions. In the exemplary embodiment of miniW, the following operations are used in an attempt to obtain better solutions.

Put PE in node: In this operation, miniW attempts to get better solutions by moving PEs around; those skilled in the art will recognize these as 1-opt neighborhood of PEs.

Swap placements of PE pairs: In this operation, miniW swaps the node allocations of pairs of PEs; these can be though of as 2-opt neighborhoods of PEs.

Put stream on node: This is also a 2-opt neighborhood move, but here miniW attempts to place PEs with affinity on the same node. PEs belonging to the same stream have traffic flowing between them, and placing them on the same node reduces traffic, at the cost of increasing node utilization.

Swap placements of stream pairs: In this operation, miniW moves pairs of PEs around in an attempt to get better solutions. These can be thought of as 4-opt neighborhoods of PEs.

Swap allocation on nodes: In this operation, miniW swaps all the PEs on a pair of nodes.

Permute link assignment: In this operation, miniW swaps two link connections on the network; those skilled in the art will recognize this as 2-OPT neighborhoods of network links.

Other embodiments may use a variety of other operations.

Scaling to large problem instances:

Since the problem to be solved is expected to be very large in size (thousands of PEs and hundreds of nodes), an exemplary embodiment employs a variety of techniques to deal with problem size. Two of such techniques are described below.

Pre-processing: In the normal operation of a stream processing system, one may expect to run in a multiple epoch environment with changes constrained from one epoch to another. In such settings, the problem is first reduced to one where elements that cannot be modified are mapped away. The elements that will be mapped away are:

PEs that are fixed to nodes;
Streams whose PEs are fixed;
Nodes which are down or fully utilized;
Clusters for which all nodes are down or fully utilized.

The reduced problem is often of much smaller size than the original. Furthermore, the starting solution heuristic considers the previous epochs solution in its attempt to build a starting solution.

Hierarchical decomposition ("divide and conquer"): To scale to large numbers of PEs and PNs, the design of miniW is preferably hierarchical and there are at least two levels in the hierarchy. Suppose there are a large number of PNs. These PNs are partitioned into well-connected pieces (in the sense on network connectivity) called clusters. The clusters may include a relatively smaller number of PNs.

At the top level in miniW, a decision is made for each PE into which of the one or more clusters the PE will be assigned. After this phase, it is known, for each PE, the cluster(s) to which the PE will be assigned. Next, a smaller problem is solved within each cluster, to determine the PN allocations for each PE.

An exemplary embodiment (and other embodiments) may use other schemes for scaling to large problem sizes. Pre-processing and hierarchical decomposition are just two of the many possible schemes, as anyone well versed in the art knows.

Avoiding local optima: Those skilled in the art of local improvement heuristics know that it is possible for such schemes to get trapped in local optima (as opposed to the global optima). A local optima is a solution for which no local operations improve the value of the solution. The exemplary embodiment of miniW uses a variety of schemes to avoid getting trapped in local optima, as described herein. However, it will be understood that other embodiments may utilize other schemes for avoiding local optima.

Perturbation: The heuristic is designed to run until it runs out of time, or cannot improve the solution. To prevent itself from getting trapped in local optima, the heuristic perturbs the current best solution whenever it is in a local optima, in an attempt to find other local optimal solutions.

This phase is called the perturb solution phase, and uses the same operations as the local improvement phase, but ignoring whether the solution is improved, just that the solution remains feasible.

Other embodiments of macroW may solve the problems iteratively, hierarchically or sequentially. In one such embodiment, one could model macroW as two separable problems:

Given network topology, allocate processing elements (PEs) to nodes to minimize bandwidth, subject to the usual constraints. In this problem, the network is assumed to be fixed, and thus this is the same problem as macroW for static network.

Given allocation of PEs to PNs, determine the network topology. In this problem, the allocation is assumed to be fixed, and thus this problem is titled the Link Assignment problem (LAP).

Each of these problems is much easier than the combined problem, and an alternate embodiment may solve the problem iteratively, solving one after the other, until no improvements are found.

Figure 6:
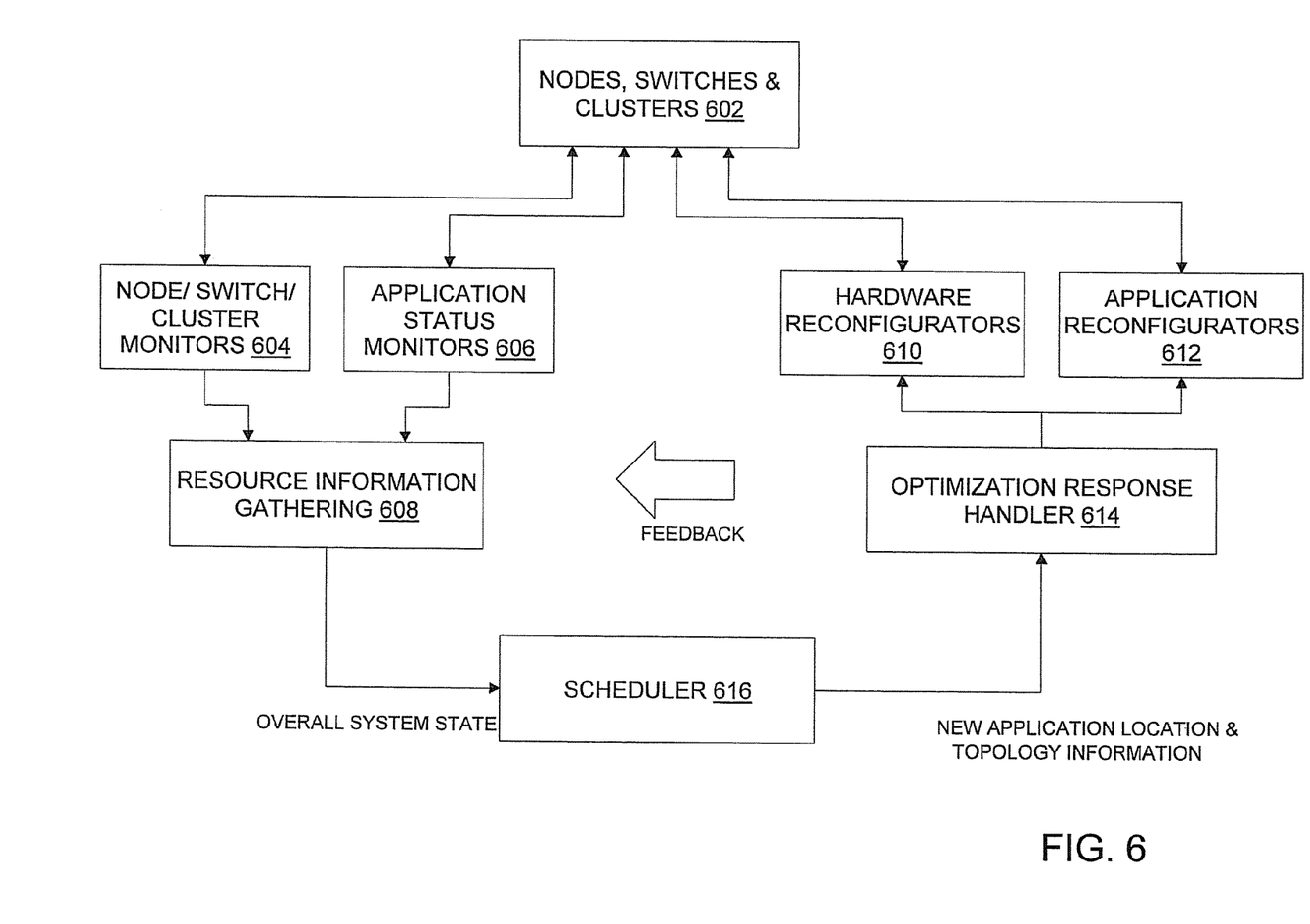
FIG. 6 is a block diagram of a system upon which the scheduler of FIG. 3 may be implemented in accordance with an exemplary embodiment.

Turning now to FIG. 6, an exemplary system upon which the scheduler 82 may be implemented will now be described. The system of FIG. 6 illustrates a logical overview of an implementation of a stream processing system controlling reconfigurable switches.

Some components of the system of FIG. 6 may be distributed (not shown) and present on each node. They are responsible for monitoring and controlling the applications on the nodes. One or more instances of the system shown in FIG. 6 can be used to monitor multiple instances of the distributed components. The system of FIG. 6 may be described as a combination of three parts. One part comprises monitors 604, 606, and resource information gathering 608. A second part comprises hardware reconfigurators 610, application reconfigurators 612, and optimization response handler 614. A third part comprises a scheduler 616, which corresponds to the scheduler 82 of FIG. 3. Components 604, 606, and 608 collectively monitor, gather and analyze information on nodes, switches, clusters, applications running, etc. (602). The components 604, 606, and 608 provide this information to scheduler 616. The scheduler 616 is responsible for analyzing current system information and determining new parameters for reconfiguring various aspects of the system. It can move applications and reconfigure the network for optimal resource utilization. Components 610, 612, and 614 are collectively responsible for translating scheduler provided output (e.g., new application location and network topology information) into actual commands/operations that are responsible for reconfiguration. The system of FIG. 6 runs on one or more nodes (e.g., nodes 23A-23D in FIG. 2) in the network that it is managing. Some control information may also be fed back from the reconfiguration part (i.e., components 610, 612, and 614) to the monitoring part (i.e., components 604, 606, and 608) as represented by a feedback arrow illustrated in FIG. 6.

The system of FIG. 6 may operate over various types of networks, e.g., an optical circuit switched network. A commonly assigned disclosure, filed currently herewith, entitled "METHOD, SYSTEM, AND COMPUTER PROGRAM PRODUCT FOR IMPLEMENTING STREAM PROCESSING USING A RECONFIGURABLE OPTICAL SWITCH", U.S. Pat. No. 8,125,984, issued Feb. 28, 2012, is hereby incorporated herein by reference in its entirety. This disclosure summarizes one embodiment of a stream processing system with a configurable network that is implemented using optical circuit switches.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of scheduling stream-based applications in a distributed computer system with configurable networks, comprising:

choosing, at a highest temporal level, jobs having a priority assigned at the highest temporal level and that will run, an optimal template alternative for the jobs that will run, network topology on which the jobs will run, and candidate processing nodes for processing elements of the optimal template alternative for each job that will run;

determining an importance of work at the highest temporal level of each job that will run based on the priority of each job assigned at the highest temporal level, determining an overall importance of the work performed by the system based on the importance of work at the highest temporal level of each job that will run, and maximizing the overall importance of work performed by the system based on the choosing, at the highest temporal level, of the jobs that will run, the optimal template alternative, the network topology on which the chosen jobs will run, and the candidate processing nodes;

making, at a medium temporal level, fractional allocations and re-allocations of the processing elements to the candidate processing nodes chosen at the highest temporal level in the system to react to changing of the importance of work determined at the highest temporal level; and revising, at a lowest temporal level, the fractional allocations and re-allocations performed at the medium temporal level on a continual basis to react to burstiness of the work, and to differences between projected and real progress of the work.

2. The method as recited in claim 1, further comprising:
repeating one or more of the choosing, making, and revising to schedule the work and configure each of the configurable networks.

3. The method as recited in claim 1, wherein at least one of the configurable networks comprises an optical circuit switch network.

4. The method as recited in claim 1, further comprising:
managing utilization of time at the highest and medium temporal levels by comparing an elapsed time with time needed for one or more processing modules.

5. The method as recited in claim 1, further comprising:
handling new and updated input data to adjust the network topology and scheduling of the work.

6. A non-transitory computer program product for scheduling stream-based applications in a distributed computer system with configurable networks, the computer program product comprising:
a storage medium readable by a computer processor and storing instructions for execution by the computer processor for implementing a method, the method comprising:
choosing, at a highest temporal level, jobs having a priority assigned at the highest temporal level and that will run, an optimal template alternative for the jobs that will run, network topology on which the jobs will run, and candidate processing nodes for processing elements of the optimal template alternative for each job that will run;
determining an importance of work at the highest temporal level of each job that will run based on the priority of each job assigned at the highest temporal level, determining an overall importance of the work performed by the system based on the importance of work at the highest temporal level of each job that will run, and maximizing the overall importance of work performed by the system based on the choosing, at the highest temporal level, of the jobs that will run, the optimal template alternative, the network topology on which the chosen jobs will run, and the candidate processing nodes;
making, at a medium temporal level, fractional allocations and re-allocations of the processing elements to the candidate processing nodes chosen at the highest temporal level in the system to react to changing of the importance of work determined at the highest temporal level; and
revising, at a lowest temporal level, the fractional allocations and re-allocations performed at the medium temporal level on a continual basis to react to burstiness of the work, and to differences between projected and real progress of the work.

7. The computer program product as recited in claim 6, further comprising instructions for implementing:
repeating one or more of the choosing, making, and revising to schedule the work and configure the network.

8. The computer program product as recited in claim 6, wherein the configurable network comprises an optical circuit switch network.

9. The computer program product as recited in claim 6, further comprising instructions for implementing:
managing utilization of time at the highest and medium temporal levels by comparing an elapsed time with time needed for one or more processing modules.

10. The computer program product as recited in claim 6, further comprising instructions for implementing:
handling new and updated input data to adjust the network topology and scheduling of the work.

11. A method for scheduling stream-based applications in a distributed computer system, comprising:
providing a scheduler configured to schedule work using three temporal levels;
configuring the network and scheduling the jobs that will run, in a highest temporal level, in accordance with a plurality of operation constraints determined at the highest temporal level, the plurality of operation constraints including a priority assigned to each job that will run;
determining an importance of work at the highest temporal level of each job that will run based on the priority of each job determined at the highest temporal level, determining an overall importance of the work performed by the system based on the importance of work at the highest temporal level of each job that will run to optimize an overall importance of work of the distributed computer system;
fractionally allocating, at a medium temporal level, processing elements to processing nodes chosen at the highest temporal level in the system to react to changing importance of the work determined at the highest temporal level; and
revising, at a lowest temporal level, the fractional allocations performed at the medium temporal level on a continual basis to react to burstiness of the work, and to differences between projected and real progress of the work.

12. The method as recited in claim 11, further comprising:
repeating one or more of the scheduling, allocating, and revising to configure the network and schedule the work.

13. The method as recited in claim 11, wherein the configurable network comprises an optical circuit switch network.

14. The method as recited in claim 11, further comprising:
managing utilization of time at the highest and medium temporal levels by comparing an elapsed time with time needed for one or more processing modules.

15. The method as recited in claim 11, further comprising:
handling new and updated input data to adjust the network topology and scheduling of the work.

16. An apparatus for scheduling stream-based applications in a distributed computer system with configurable networks, comprising:
a scheduler computer configured to schedule work using three temporal levels including:
a macro method configured to determine network topology on which jobs will run and schedule the jobs that will run, in a highest temporal level, in accordance with a plurality of operation constraints determined at the highest temporal level, the plurality of operation constraints including a priority assigned to each job that will run;
determining an importance of work at the highest temporal level of each job that will run based on the priority of each job determined at the highest temporal level, determining an overall importance of the work performed by the system based on the importance of work at the highest temporal level of each job that will run to optimize an overall importance of work of the distributed computer system;
a micro method configured to fractionally allocate, at a medium temporal level, processing elements to processing nodes chosen at the highest temporal level in the system to react to changing importance of the work determined at the highest temporal level; and
a nano method configured to revise, at a lowest temporal level, the fractional allocations performed at the medium temporal level on a continual basis to react to burstiness of the work, and to differences between projected and real progress.

17. The apparatus as recited in claim 16, wherein the macro method includes a quantity component configured to maximize importance by deciding which jobs to do, by choosing a template for each job that is done, and by computing flow balanced processing element processing allocation goals, subject to job priority constraints.

18. The apparatus as recited in claim 17, wherein the macro method includes a where component configured to minimize projected network traffic by simultaneously determining the network topology and uniformly over-provisioning nodes to processing elements based on the goals given by the quantity component, subject to constraints.

19. The apparatus as recited in claim 18, wherein the macro method includes an input module and an output module, and delta models which permit updates and corrections in input data for the quantity and where components.

20. The apparatus as recited in claim 16, wherein the micro method includes a quantity component configured to maximize real importance by revising allocation goals to handle changes in weights of jobs, changes in jobs, and changes in node states.

21. The apparatus as recited in claim 18, wherein the micro method includes a where component configured to minimize differences between goals output by the quantity component and achieved allocations.

22. The apparatus as recited in claim 18, wherein the micro method includes an input module and an output module, and delta models which permit updates and corrections in input data for the quantity and where components.

23. The apparatus as recited in claim 16, wherein the micro method operates at a temporal scale of one order of magnitude less than the macro method.

24. The apparatus as recited in claim 16, wherein the nano method operates at a temporal scale of two orders of magnitude less than the micro method.

25. The apparatus as recited in claim 16, wherein at least one of the configurable networks comprises an optical circuit switched network.

26. The apparatus as recited in claim 16, wherein the scheduler handles new and updated input data employing the macro, micro and nano methods.

* * * * *